No. 864,663. PATENTED AUG. 27, 1907.
C. MARKEL.
DRIVING BOX BRASS.
APPLICATION FILED APR. 13, 1906.

Witnesses:
Robert Everitt,
F. R. Erney.

Inventor:
Charles Markel.
By James L. Norris.
Atty.

UNITED STATES PATENT OFFICE.

CHARLES MARKEL, OF CLINTON, IOWA.

DRIVING-BOX BRASS.

No. 864,663.　　　Specification of Letters Patent.　　　Patented Aug. 27, 1907.

Application filed April 13, 1906. Serial No. 311,520.

*To all whom it may concern:*

Be it known that I, CHARLES MARKEL, a citizen of the United States, residing at Clinton, in the county of Clinton and State of Iowa, have invented new and useful Improvements in Driving-Box Brasses, of which the following is a specification.

This invention relates to a removable driving box brass having structural features and an arrangement which will overcome deficiencies heretofore existing in analogous devices.

What is at present known as driving box brasses are half cylinders of brass used in the boxes of locomotive engines, in which the axle of the driving wheels revolves. The box itself is made of cast steel and the weight of the engine rests on these boxes and the boxes rest on the axle of the drivers. In these boxes, and on top of the axle, is securely fastened a half cylinder of brass about two inches in thickness and of the length of the bearing axle in which the latter revolves. This brass cylinder, as now commonly used in the boxes, is pressed in place by hydraulic pressure of several tons and has to fit closely and firmly. The brass, when in use, becomes loose in the outer side next the steel, on account of expansion and contraction, but it always keeps in contact with the axle on the under side. When it becomes loose on the outer side it allows a movement of the axle and the brass, causing a jarring and racking of the machinery, and to obviate this disadvantage and to provide for ready means of repair is the object of this invention. The only available means of repairing the injured brass now in use is to take the locomotive into the shops, remove the wheels, dismember the lower structure of the engine, remove the boxes, and take out the brass and put in new ones, which, in an ordinary locomotive engine requires several days.

The improved brass cylinder is of the same size as the brasses now commonly used, and an opening is made in the boxes just below one end of the cylinder, and so shaped as to be adapted to receive a wedge, this wedge being driven in under the end of the brass cylinder, thus forcing the latter in place as securely as can be done with the ordinary brass with a pressure of several tons. When the improved brass becomes loose from any cause it can be securely fitted in place by a movement of the wedge, or if it is necessary to remove the brass and put in a new one, it can be done by simply raising the box off the axle, taking out the wedge, and pulling out the brass, without removing the box from its position or taking off any part of the structure except the brass itself.

Figure 1:
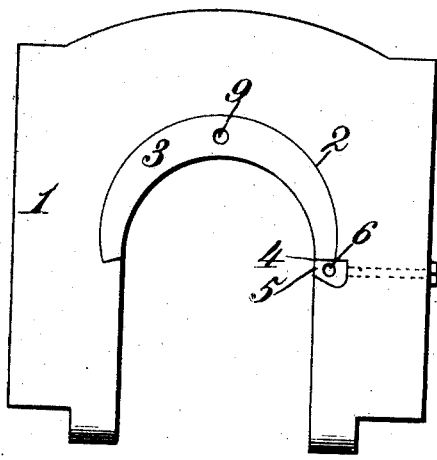
Figure 2:
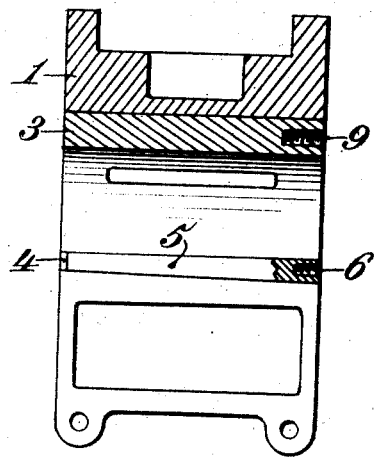
Figure 4:
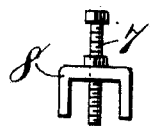
Figure 3:
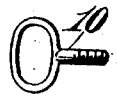

In the accompanying drawing, Figure 1 is an end elevation of a driving box embodying the features of the invention. Fig. 2 is a transverse vertical section through the center thereof. Fig. 3 is a detail view showing a device for removing the improved brass. Fig. 4 is a detail view showing the device for operating a wedge serving as a securing means for the present improved brass construction.

Similar numerals of reference are employed to indicate corresponding parts in the several views.

In the drawings the numeral 1 designates a driving box which, as usual, is preferably made of cast steel, and has fitted in the upper extremity or arch 2 of the axle slot a semicylindrical brass 3 which is preferably continuous. At the lower terminal of one extremity of the arch 2 a tapered opening 4 is formed, as clearly shown by Fig. 2, and therein is removably inserted a wedge 5, which is preferably of the shape in cross section indicated in end elevation by Fig. 1. This wedge 5 is constructed from any suitable metal and has a threaded opening 6 in the enlarged extremity thereof, which is adapted to be engaged by a screw 7 held by a yoke 8 for the purpose of removing the wedge when it is desired to withdraw the brass 3. The brass at the center of one end also has a screw threaded socket 9 formed therein for engagement by the screw threaded shank of a key 10, by means of which the said brass may be withdrawn. To hold the wedge 5 in immovable relation with respect to the lower extremity or one end of the brass 3, a set screw 11 is inserted transversely with relation to the wedge, or inwardly through one side of the box 1. When this set screw is tightened up it will be obvious that the wedge cannot become accidentally disengaged or loosened, which might ensue from jars and vibration if the set screw was not used. As before indicated, however, the essential feature of the invention resides in the brass 3, having means for tightly fitting it within the driving box, as set forth, and for compensating for wear, so that the brass may always be held tightly within the box. The wear which results in loosening the brasses, as now commonly employed, is taken up through the adjustment of the wedge 5.

Another important feature is that the improved brass can be readily removed from the box by a very simple operation, and without requiring the delay and dismemberment of the parts of the locomotive as now commonly pursued in connection with the ordinary form of brass. In fact the improved brass can be removed from the box without withdrawing any part whatever except the brass itself. The improved brass, therefore, is materially advantageous in reducing the cost of manufacture and expense and time now required in removing and replacing the ordinary brasses, and further, the wedge forming part of the improved structure obviates the necessity of using hydraulic pressure to secure the brasses in place.

Having thus described the invention, what is claimed, is:

1. The combination with a driving box, of a continuous arcuate brass removably mounted therein, and a longitudinally tapering wedge removably and adjustably engaging one terminal of the brass.

2. The combination with a driving box having an arcuate recess in the upper portion thereof, of a continuous arcuate brass removably mounted in said recess, and a longitudinally tapering wedge engaging one extremity of the brass and adjustable to take up wear.

3. The combination with a driving box having an axle slot, of a continuous semi-circular brass fitted in the upper extremity or arch of the said slot, and a longitudinally tapering wedge removably and adjustably fitted in the box and engaging one extremity of the brass, both the brass and the wedge having exposed structural means for removing and adjusting the same.

4. The combination with a driving box having an axle slot therein, of a continuous arcuate brass fitted in the upper extremity or the arch of the said slot and provided with an exteriorly exposed socket at one end for the application thereto of removing means, and a longitudinally tapered wedge removably and adjustably fitted in the box and engaging one extremity of the brass, the said wedge also having an exteriorly exposed socket for receiving an adjusting and removing device.

5. In a journal bearing, the combination with the box having an axle opening therein enlarged at the top and such enlargement extending down on each side of the opening, of a removable bearing brass fitting in said opening, and a locking key interposed between the lower edge of said brass and lower end of the enlargement of the axle opening, substantially as described.

6. In a journal bearing, the combination with the box having an axle opening therein enlarged at the top and such enlargement extending down on each side of the opening, of a removable bearing brass fitted in said opening, and a wedge-shaped locking key interposed between the lower edge of the brass and lower end of the enlargement of the axle opening, substantially as described.

7. In a journal bearing, the combination with the box having an axle opening therein enlarged at the top and such enlargement extending down on each side of the opening and terminating in under-cut walls, of a removable bearing brass fitting in said opening, and a wedge-shaped locking key interposed between the lower edge of the brass and lower under-cut end of the enlargement of the opening, substantially as described.

In testimony whereof I have hereunto set my hand in presence of two subscribing witnesses.

CHARLES MARKEL.

Witnesses:
W. C. H. HALLIDAY,
L. W. BARKER.